Nov. 19, 1957     R. A. BRUTSCHER, SR., ET AL     2,813,939
ELECTRICAL CONTROL SYSTEM
Filed Dec. 12, 1955                            2 Sheets-Sheet 1
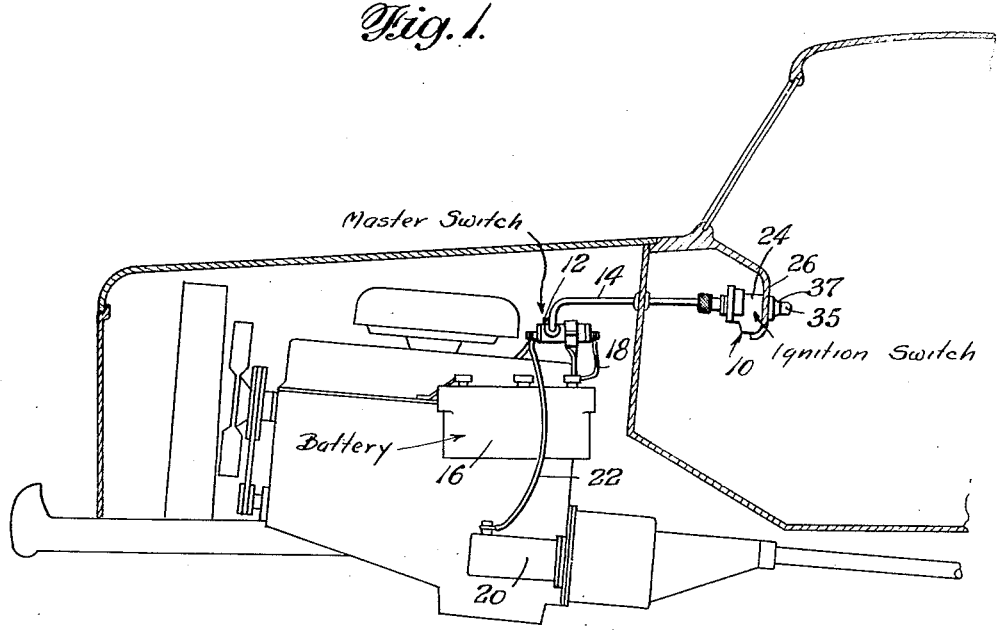
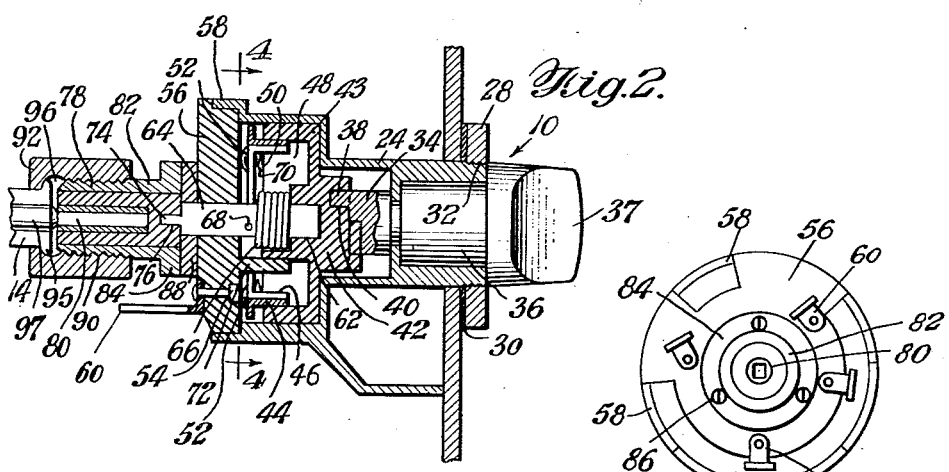
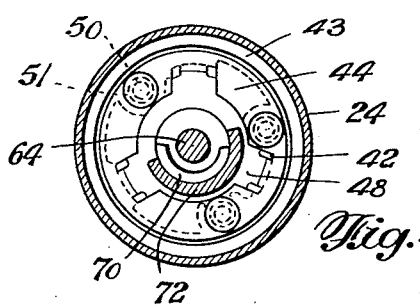
INVENTORS
Rufus Afton Brutscher, Sr.
Rufus Afton Brutscher, Jr.
BY Gustav Miller
ATTORNEY

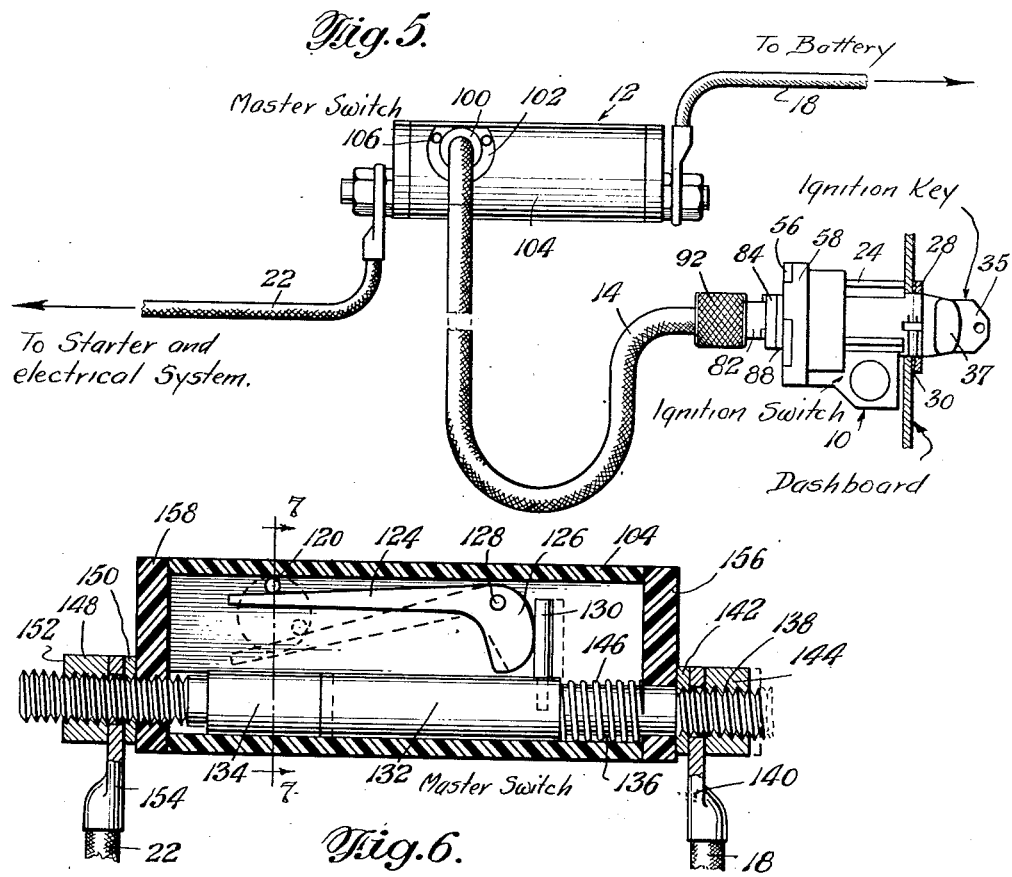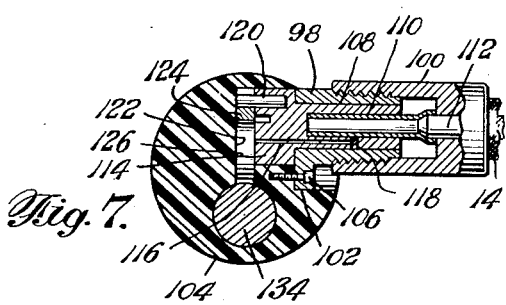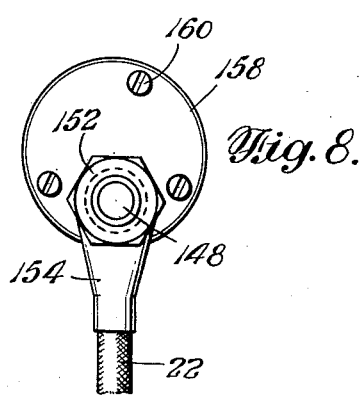

United States Patent Office 2,813,939
Patented Nov. 19, 1957

2,813,939

ELECTRICAL CONTROL SYSTEM

Rufus Afton Brutscher, Sr., and Rufus Afton
Brutscher, Jr., Pendleton, Oreg.

Application December 12, 1955, Serial No. 552,437

5 Claims. (Cl. 200—44)

This invention relates to a control means for closing and opening the electrical system of an automotive vehicle and the like; and it particularly relates to a control means of this type which is automatically operated from the ignition switch of the vehicle.

In all instances heretofore, when the ignition switch was in "off" position, there was still a flow of current in the system. This meant that electrically-operated parts, such as the lights, horn or radio could be operated even with the ignition off. As a result, the lights or radio would be inadvertently left on or the horn, if it became stuck, could not be turned off without disconnecting the wires. It was also possible for children or others to get into the car and turn on the electrically-operated parts. If a short circuit should occur in the system, there was always the danger of a fire. In addition to all this, when it was necessary to make repairs, it was first best to disconnect the battery to prevent injury to either the vehicle, the mechanic or both.

It is, therefore, one object of the present invention to provide a means for automatically cutting off the current in the electrical system of an automotive vehicle when it is not in operation.

Another object of the present invention is to provide such a means, as set forth above, which is simple and easily installed in a conventional system.

Other objects of the present invention are to provide an improved device, of the character described, that is easily and economically produced, which is sturdy in construction, and which is highly efficient in operation.

With the above, and relates objects in view, this invention consists in the details of construction and combination of parts, as will be more fully understood from the following description, when read in conjunction with the accompanying drawings in which:

Fig. 1 is a diagrammatic view showing the device installed in an automobile.

Fig. 2 is a longitudinal sectional view of the ignition switch mechanism used in the system.

Fig. 3 is a rear elevational view of the ignition switch assembly.

Fig. 4 is a cross-sectional view taken on line 4—4 of Fig. 2.

Fig. 5 is a diagrammatic view of an arrangement embodying the present invention and including the ignition and master switch assemblies.

Fig. 6 is a longitudinal sectional view of the master switch assembly.

Fig. 7 is a cross-sectional view taken on line 7—7 of Fig. 6.

Fig. 8 is an end view of the master switch assembly.

Referring now in greater detail to the drawings wherein similar reference characters refer to similar parts, there is shown an ignition switch device, generally indicated at 10, which is connected to a master switch device, generally indicated at 12, by a cable 14. The master switch 12 is connected both to the battery 16, as by cable 18, and to the starter mechanism 20, as by cable 22.

The ignition switch assembly 10 comprises a housing 24 mounted in the dashboard 26 by means of a nut 28, washer 30, and external threads 32 on the end of the housing.

Within the housing 24 is a shaft 34 connected to the barrel 36 adapted to be turned by knob 37 when the key 35 is inserted and turned. In most cars today, the key, itself, acts as the knob. The shaft 34 is provided with a lug 38 insertable into a recess 40 in the hub 42 of a disc 43. A contact ring 44 is provided with detents 46 extending into recesses 48 in the disc. Coil springs 50, positioned in other recesses 51 in the disc 43, press the ring 44 rearwardly. A plurality of contact knobs 52 extend rearwardly from the ring 44 in position to engage with contacts 54 on a cover disc 56, upon rotation of the ring 44. The cover disc 56 is seated within flanges 58 on disc 43. Connectors 60 are attached to the contacts 54 and extend rearwardly from the cover disc 56.

The hub 42 of the disc 43 is provided with a recess 62 in which is positioned one end of a pin 64. The pin 64 extends rearwardly through the cover disc 56. A coil spring 66 surrounds the pin 64 between the hub 42 and the cover disc, the spring being connected, at one end, to the pin, as at 68, and abutting against the hub at the opposite end. A semi-circular guide 70 extends from the hub 42, around the spring, and is telescopically engaged with a similar guide 72 extending from the cover disc 56.

The rear end of the pin 64 is provided with a lug 74 adapted to engage in a corresponding slot 76 in the front end of a barrel 78. The barrel 78 is provided with a rearwardly opening internal sleeve 80, and is rotatably positioned in a bushing 82. The bushing 82 is provided with a flange 84 connected to the cover disc 56 by means of screws 86. A washer 88 is positioned between the flange 84 and the cover disc 56. The bushing 82 is externally threaded at 90 to engage with a coupling sleeve 92 for coupling the bushing to the cable 14. The cable 14 has a flange 95 which is loosely held in the recess 96 of the coupling sleeve 92. The cable is also provided with an internal pin 97 having an outwardly extending, beveled end to fit into sleeve 80 of the cylinder 78 to increase the coupling effect.

The cable 14 is coupled, at its opposite end, to an externally threaded bushing 98, on the master switch assembly 12, by means of an internally threaded coupling sleeve 100. The bushing 98 is provided with a flange 102 which is connected to a master switch housing 104 by screws 106.

Positioned within the bushing 98 is a barrel 108 having a longitudinal bore in which is provided a sleeve 110. The outer end of the sleeve 110 extends outwardly of the bore and is provided with an enlarged end adapted to receive the beveled end of a pin 112 connected to the cable 14. A flange 114 is provided on the inner end of the barrel 108, this flange 114 abutting against the inner end of the bushing 98. An annular series of narrow grease openings 116 extend partially through the barrel 108 and are provided with lateral filling openings 118.

Extending from the flange 114 is a pin 120. This pin 120 is eccentrically mounted on the face of the flange 114. The flange and its pin 120 are positioned in a lateral opening in the housing, which is, otherwise, generally solid. This lateral opening intersects a longitudinal slot 122 in the interior of the housing. The pin 120 extends into this slot and overlies a lever 124 integral with a cam 126. The cam 126 is eccentrically pivoted within the slot, as at 128, and is adapted to contact a pin 130 extending upwardly from a rod 132. The rod 132 is positioned in a cylindrical opening, at the bottom portion of the housing, in coaxial arrangement with a second rod 134.

The first rod 132 is provided with a reduced portion 136 extending outwardly through the housing and provided, on its outer end, with threads 138. A contact 140 of the battery cable 18 is connected to the threaded end of the first rod 132, by nuts 142 and 144. Within the housing 104 a coil spring 146 surrounds the reduced portion 136 and acts to bias the first rod 132 to the left, as viewed in full line in Fig. 6. In this position, it is in electrical contact with the second rod 134. The second rod 134 is provided with a reduced, threaded portion 148 which is not only threadedly engaged in the housing wall, to hold the second rod 134 fixed, but also provides a support for the nuts 150 and 152 which couple the contact 154 of starter cable 22 to the master switch, and which is also adjustment for lever 124. An end plate, as at 156 and 158, held in place by screws 160, closes each end of the housing.

In operation, during the time that the ignition 37 is turned on, the lever 124 is in the position shown in full line in Fig. 6. At this time the spring 146 biases the first rod 132 into axial contact with the second rod 134 and the electrical circuit between the various parts of the system is closed. When the ignition is turned off, however, the pin 64 is rotated at the same time. This pin then acts, through the connection between the barrel 78 and the cable 14, to rotate the barrel 108 at the master switch. This moves the cam pin 120 to force the lever 124 into its dotted line position, as shown in Fig. 6. When this happens, the cam 126 pivots on pivot pin 128 and forces the pin 130 to the right, as viewed in Fig. 6. This moves the rod 132 away from 134 and opens the master switch, thereby opening the circuit.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. In an electrical system for automotive vehicles, a rotatable ignition switch, actuating means rotatable with said ignition switch, said actuating means being connected to a cam device situated within a master switch housing, said cam device being movable by said actuating device to pivot an operating cam within said housing, said operating cam being in contact with a cam follower extending from an axially movable rod, said rod being resiliently biased into axial contact with a second rod but being movable out of contact therewith when said operating cam is pivoted by said cam device, each of said rods extending axially out of housing, and electrical connections provided on each of said rods externally of said housing.

2. In an electrical system for automotive vehicles, an ignition switch, said ignition switch comprising a housing, a rotatable disc within said housing, means to rotate said disc, at least one contact connected to said disc, means to resiliently urge said contact toward a stationary contact on a cover plate fixed on said housing, a pin extending from one face of said disc through said cover plate, a coupling means connected to the outer face of said cover plate, a rotatable barrel within said coupling means, a flexible cable having one end loosely clamped within said coupling means, a connector between said cable and said barrel, and the opposite end of said cable being connected to an actuating means in a master switch housing, said actuating means being arranged to open and close a switch in said master switch housing upon rotation of said pin.

3. In an electrical system for automotive vehicles, a master switch device, said device comprising a closed housing, a pair of coaxially arranged rods in said housing, each of said rods having end portions extending through corresponding end walls of said housing, the end portion of one of said rods being threadedly engaged with its corresponding housing end wall, and the end portion of the other of said rods being slidable through its corresponding housing end wall, electrical contact means coupled to the end portion of each of said rods externally of said housing biasing means resiliently urging said second-mentioned rod toward said first-mentioned rod, a cam follower connected to said second-mentioned rod, a cam pivotally arranged in said housing and positioned in abutting relationship to said follower, a lever connected to said cam, operating means in said housing to move said lever to pivot said cam, said cam being arranged to, thereupon, move said follower against the force of said biasing means, and means operatively connecting said operating means to an ignition switch mechanism in said system.

4. The invention of claim 3 wherein said housing is substantially solid, said operating means, lever, cam and follower being positioned in an internal slot in said housing, the walls of said slot acting as a guide means for the parts therein, and said rods being positioned in a longitudinal bore in said housing, said bore being intersected by said slot.

5. The invention of claim 3 wherein said operating means is a pin eccentrically mounted on the end face of a barrel, said barrel being connected to the end of a cable within a coupling device, said cable having its other end connected to an actuating member movable with the movable contacts of said ignition switch mechanism.

References Cited in the file of this patent

UNITED STATES PATENTS

| | | |
|---|---|---|
| 1,616,956 | Farrell | Feb. 8, 1927 |
| 1,694,382 | Hemingway | Dec. 11, 1928 |
| 1,935,509 | Leeah et al. | Nov. 14, 1933 |
| 2,118,012 | Lowe | May 12, 1938 |
| 2,121,671 | Schwarze | June 21, 1938 |
| 2,545,965 | McCamon | Mar. 20, 1951 |